(12) United States Patent
Chant

(10) Patent No.: US 10,717,630 B1
(45) Date of Patent: Jul. 21, 2020

(54) LIGHT WEIGHT LOAD BEARING SHACKLE WITH FIBER ROPE BOW

(71) Applicant: Chant Engineering Co. Inc., New Britain, PA (US)

(72) Inventor: Philip Chant, Perkasie, PA (US)

(73) Assignee: Chant Engineering Co. Inc., New Britain, PA (US)

(*) Notice: Subject to any disclaimer, the term of this patent is extended or adjusted under 35 U.S.C. 154(b) by 0 days.

(21) Appl. No.: 16/273,433

(22) Filed: Feb. 12, 2019

(51) Int. Cl.
*B66C 1/12* (2006.01)
*B66C 1/18* (2006.01)
*F16G 11/14* (2006.01)

(52) U.S. Cl.
CPC ............ *B66C 1/12* (2013.01); *B66C 1/18* (2013.01); *F16G 11/146* (2013.01)

(58) Field of Classification Search
CPC ... B66C 1/12; B66C 1/18; F16G 15/04; F16G 15/06; F16G 11/146
USPC ........................... 294/74, 82.1, 82.16; 59/86
See application file for complete search history.

(56) References Cited

U.S. PATENT DOCUMENTS

| | | | | |
|---|---|---|---|---|
| 2,426,538 A * | 8/1947 | Von Wehrden | ........... | B66C 1/12 294/74 |
| 2,495,951 A * | 1/1950 | Von Wehrden | ....... | F16G 11/146 294/74 |
| 3,722,942 A * | 3/1973 | Baur | ........................ | D07B 1/18 294/74 |
| 5,018,775 A * | 5/1991 | McKenna | ................. | B66C 1/12 294/74 |
| 5,415,449 A * | 5/1995 | Kentner, Sr. | .............. | B66C 1/12 294/74 |
| 10,072,698 B2 * | 9/2018 | Pautsch | .................... | F16B 45/00 |

FOREIGN PATENT DOCUMENTS

DE  3828986 A1 * 4/1989 ............... B66C 1/18

* cited by examiner

*Primary Examiner* — Dean J Kramer
(74) *Attorney, Agent, or Firm* — Douglas J. Ryder; Ryder, Mazzeo & Konieczny LLC

(57) ABSTRACT

A light weight load bearing shackle that includes a bow that is made of a synthetic fiber rope (e.g., polypropylene, nylon, polyester, polyethylene, Aramid, acrylic, mixtures of several fibers, co-polymer fibers). The fibers making up the rope may be straight, braided and/or twisted. The fiber rope may be contained within a sheathing. The bow includes a hole formed in each leg to receive a connection pin so as to secure the open end of the shackle. The hole may be provided by or reinforced by an eyelet made of a heavy duty material such as steel. The bow may be secured around the eyelet or within the eyelet. As the fiber rope bow is flexible, the bow may include a casing between the legs that the connection pin passes through to maintain the legs a certain distance apart.

20 Claims, 11 Drawing Sheets

LIGHT WEIGHT LOAD BEARING SHACKLE WITH FIBER ROPE BOW

BACKGROUND

Shackles are devices that may provide a quick, convenient, secure and strong connection. They may also be capable of quickly and conveniently being disconnected. Shackles typically include a bow and a connection pin. The bow may be "U" shaped so as to have an open end and a closed end. The bow typically includes holes on each of the legs thereof so to receive the connection pin. The connection pin passes through each of the holes to seal off the open end of the bow and is then secured thereto. The connection pin may include one end that is larger than the holes so as to not pass therethrough. The other end may pass through the holes and then be secured within the bow in some fashion. For example, the other end of the connection pin may be threaded so as to receive a nut in order to secure the pin within the bow. Alternatively, the other end of the connection pin may include a hole formed therein that can receive a pin to secure the connection pin within the bow.

The connection pin may be removed from the bow so as to open the shackle so that the bow may be placed on an item. The connection pin may then be secured to the bow so as to secure the shackle to the item. Shackles vary in size, shape, orientation and configuration depending on what they are used for. Shackles may be used in lifting operations to connect an object to a lifting apparatus, such as a crane (often referred to as load bearing shackles). The manner in which the shackles are utilized to connect the object to the lifting apparatus may vary depending on numerous factors including, but not limited to, type of lifting apparatus used, and size and weight of object to be lifted. Load bearing shackles are typically made with a heavy duty, strong and durable material, such as, steel.

Cranes and other industrial equipment are used to hoist and move cargo, equipment and other heavy objects (hereinafter simply referred to as "load" for simplicity). The cranes may utilize cables and a plurality of pullies to lift and move the loads. The cables utilized were typically metal (e.g., steel) cables that were very strong and durable. The steel cables are very heavy and could be susceptible to corrosion (e.g., rusting). Synthetic rope cables have begun to be used as alternatives to the steel cables. The synthetic rope cables are made from hi-tech polyethylene, synthetic rope and are lighter weight and more flexible that steel cables. The lighter weight of the synthetic rope cables may make handling easier and also may enable heavier loads to be lifted (as the weight of the cable is included in the maximum load calculation of the lifting apparatus).

The weight associated with load bearing shackles may make them hard to handle, and in certain circumstances may require a lifting apparatus to put in place. Furthermore, the weight factures into the maximum load calculations. Moreover, the rigid form of the load bearing shackles make them tough to utilize in certain situations, for example, where space is limited. What is needed is a light weight load bearing shackle that is strong, durable and safe to use. Moreover, a load bearing shackle that is flexible so that it can be utilized in various situations, including where space is limited is desired. Furthermore, a corrosion resistant load bearing shackle is preferable.

BRIEF DESCRIPTION OF THE DRAWINGS

The features and advantages of the various embodiments will become apparent from the following detailed description in which.

DETAILED DESCRIPTION

Figure 1A:
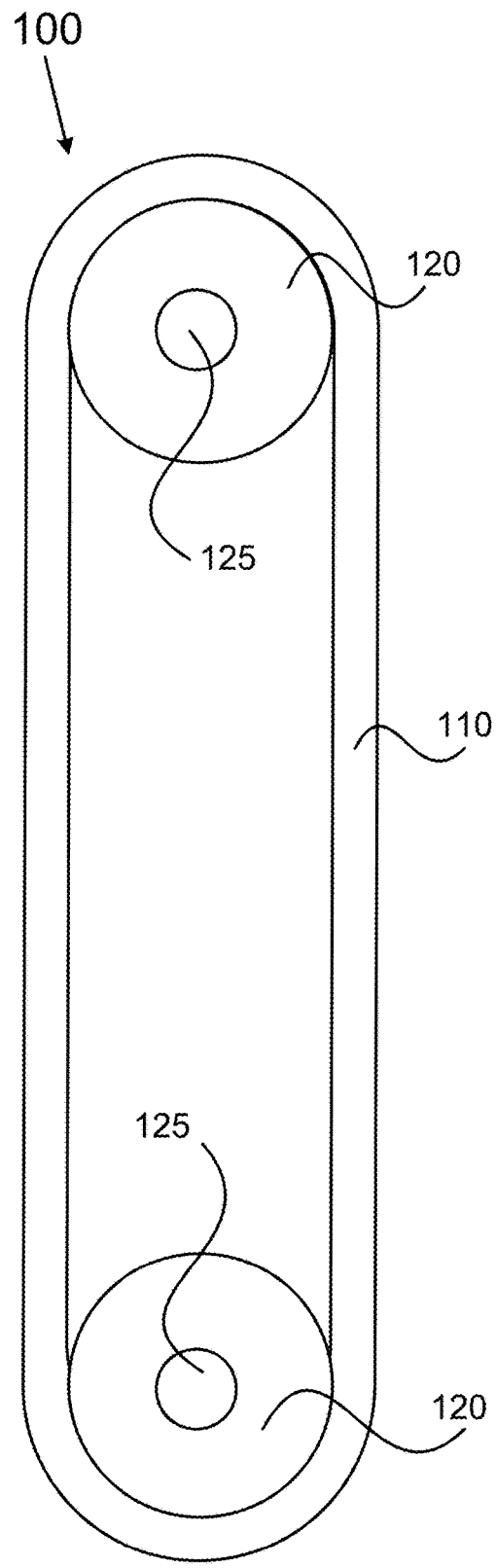
FIGS. 1A-D illustrate top views of example fiber rope bows to be used as part of light weight load bearing shackles, according to various embodiments.

A light weight load bearing shackle that is corrosion resistant and still provides the strength and durability required to lift loads is provided. The shackle includes a bow that is made of a fiber rope (e.g., synthetic fiber). The fiber rope may be made of, for example, polypropylene, nylon, polyesters (e.g. PET, LCP, Vectran), polyethylene (e.g. Dyneema and Spectra), Aramids (e.g. Twaron, Technora and Kevlar) and acrylics (e.g. Dralon). Some fiber ropes may be constructed of mixtures of several fibers or use co-polymer fibers. The fibers making up the rope may be straight, braided and/or twisted. The number, orientation and configuration of the fibers may vary depending on the type of light weight load bearing shackle it is too be used in. The fibers and/or the fiber rope may be coated. The fiber rope may be contained within a sheathing. The bow may include a single loop of the fiber rope or a plurality of loops of fiber rope. The bow includes a hole formed in some fashion on each leg to receive a connection pin so as to secure the open end of the shackle. The hole may be provided by or reinforced in various manners in order to support the connection pin. For example, an insert, gromet, eyelet or the like that is made of a heavy duty material such as steel may be used to support the connection pin. A connection pin may pass through the holes on each leg and be secured therein. As the fiber rope bow is flexible, the connection pin may include some type of support to maintain the legs a certain distance apart.

FIGS. 1A-D illustrate top views of example fiber rope bows to be used as part of light weight load bearing shackles. As illustrated, the bows are in a straight arrangement as opposed to a generally "U" shaped arrangement as is typically associated therewith. The bows include a loop of fiber rope 110 and a pair of eyelets 120. As illustrated, the fiber rope loop 110 appears to be a single loop for ease of illustration but is in no way intended to be limited thereto. Rather, the fiber rope loop 110 could include multiple loops of fiber rope (all the loops being the same type of rope or possibly using different types of rope) without departing from the current scope. The various loops of rope making up the fiber rope loop 110 may be secured together in some fashion or may be housed in a sleeve. The manner in which the loops are secured together or the material that the loops are housed in may vary without departing from the current scope.

The fiber rope loop 110 is wrapped around each of the eyelets 120. Each of the eyelets 120 includes a hole 125 therein. The eyelets 120 may be made of a strong and durable material, such as, steel. The holes 125 are to receive the connection pin (not illustrated) therein. According to one embodiment, at least one of the holes 125 may be threaded (threads not illustrated) so as to secure the connection pin therein. The fiber rope loop 110 may be secured to the eyelets 120 in some fashion (e.g., glued, molded, fused, bonded, taped, pined, riveted).

Figure 1B:
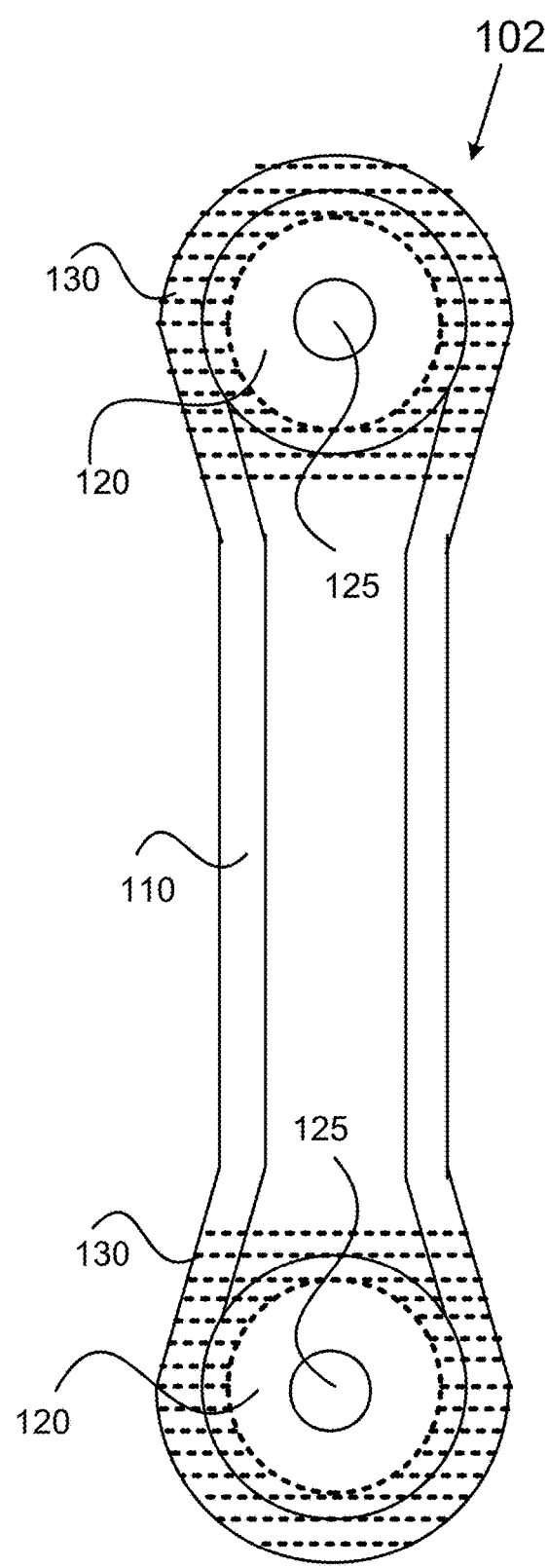

FIG. 1A illustrates an example bow 100 with no visible connection between the fiber rope loop 110 and the eyelets 120 or between upper and lower portions of the fiber rope loop 110. FIG. 1B illustrates an example bow 102 where a material 130 (illustrated as dashed lines for ease of illustration) may be formed over the fiber rope loop 110 and the eyelets 120 to help secure the fiber rope loop 110 to the eyelets 120. The material 130 may be, for example, molded therearound or taped thereto. The material 130 may be, for example, plastic, rubber or the like.

Figure 1C:
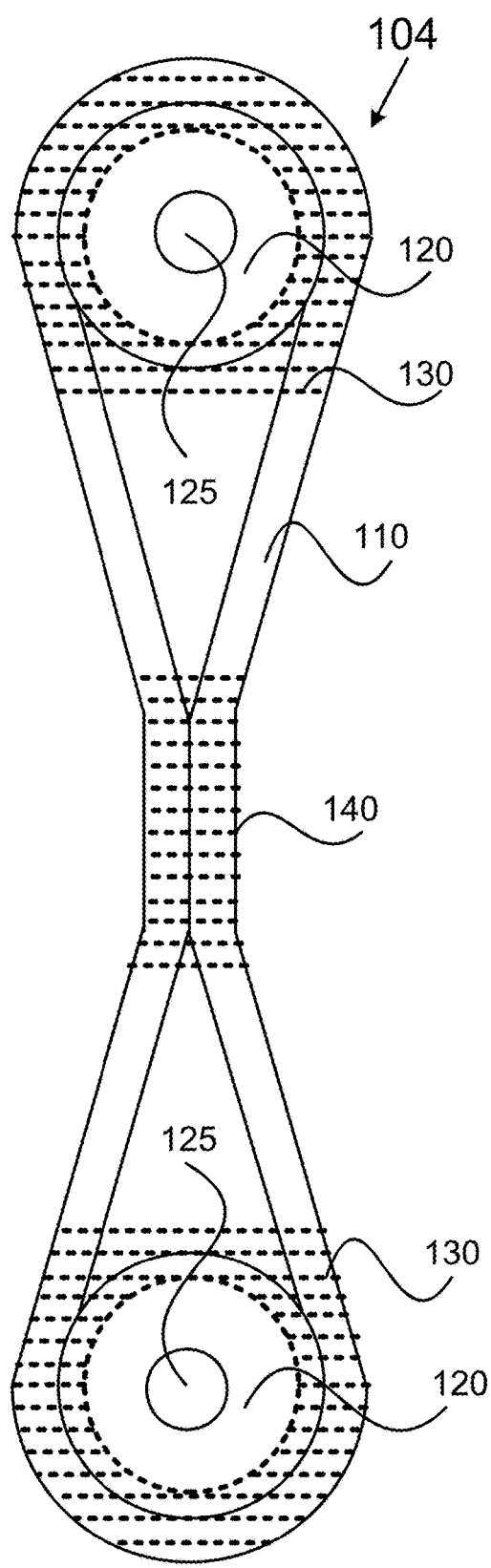

FIG. 1C illustrates an example bow 104 where in addition to the material 130 securing the fiber rope loop 110 to the eyelets 120, at least a section 140 (illustrated as dashed lines for ease of illustration) of the upper and the lower portions of the fiber rope loop 110 are secured together. The section 140 is illustrated as being a single section that is generally in the center but is not limited thereto. Rather any number of sections at any location can be connected without departing from the current scope including connecting entire top and bottom portions together. The upper and lower portions may be secured together in various manners including, for example, by wrapping a material around the upper and lower portions or by stitching or gluing the upper and lower portions together (if included in a sleeve). If the sections are secured with a material, the material may be the same or may be different than the material 130.

Figure 1D:
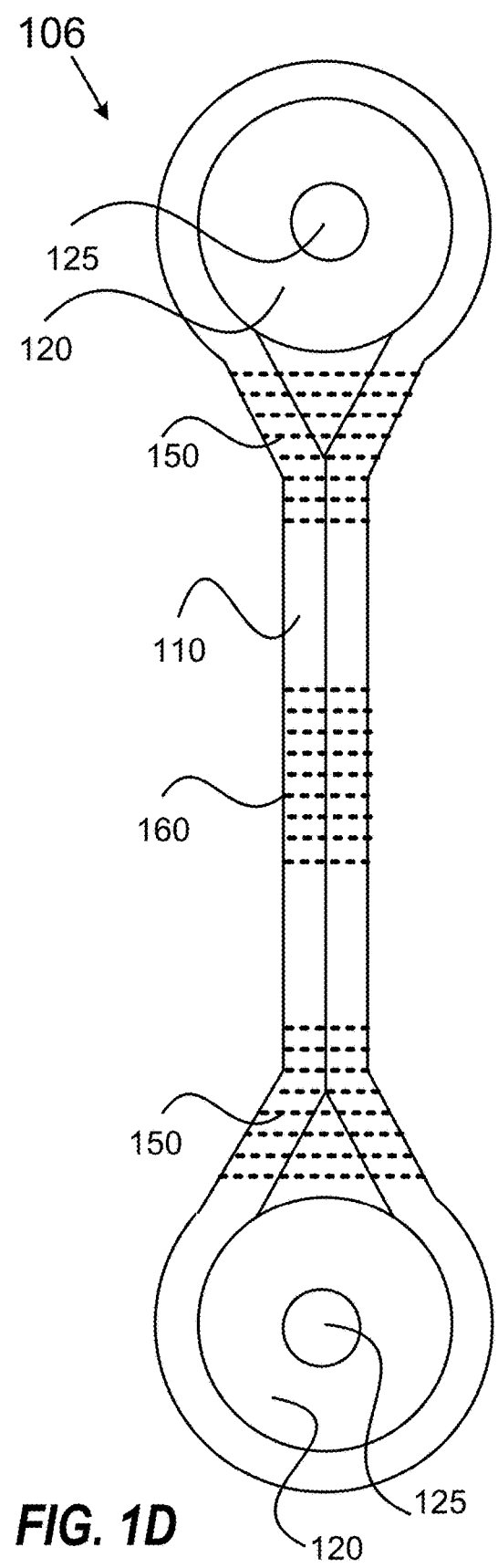

FIG. 1D illustrates a configuration of an example bow 106 where connecting the upper and lower portions of the fiber rope loop 110 together at sections 150 (illustrated as dashed lines for ease of illustration) in close proximity to the eyelets 120 assists in securing the loop 110 and the eyelets 120 together. The sections 150 may be secured together in various manners including, for example, by wrapping a material around the upper and lower portions or by stitching or gluing the upper and lower portions together (if included in a sleeve). If the sections 150 are secured with a material, the material may be, for example, molded therearound or taped thereto and may be, for example, plastic, rubber or the like. In addition to the upper and lower portions of the fiber rope loop 110 being secured together in close proximity to the eyelets 120, they may also be secured together at one or mode additional sections 160 (illustrated as dashed lines for ease of illustration). The additional section(s) 160 is illustrated as being a single section that is generally in the center but is not limited thereto. Rather any number of sections at any location can be connected without departing from the current scope including connecting entire top and bottom portions together. If the additional section(s) 160 are secured with a material, the material may be the same or may be different than the material used for sections 150.

Figure 2A:
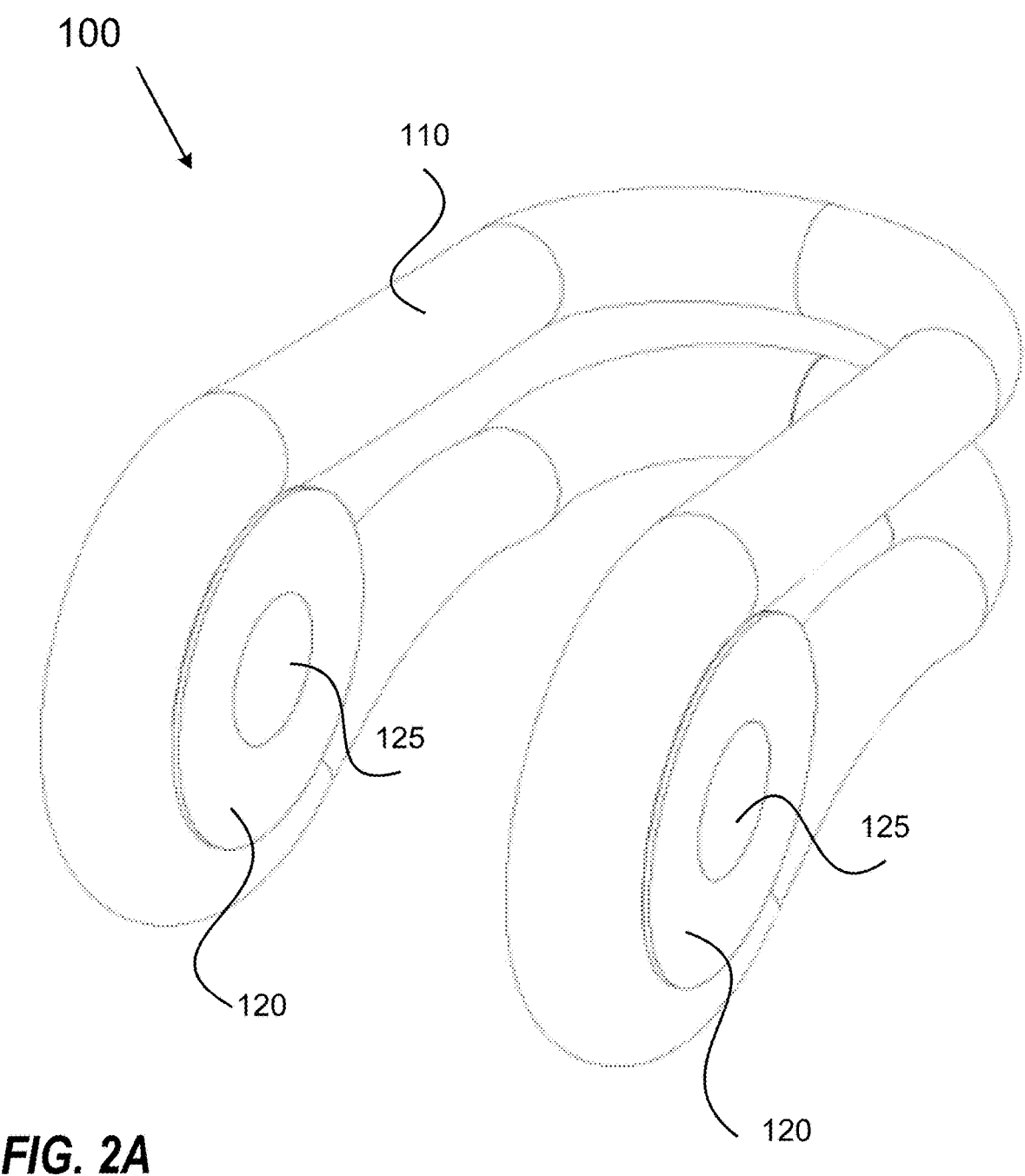
FIGS. 2A-B illustrate perspective views of example fiber rope bows to be used as part of light weight load bearing shackles, according to various embodiments.
Figure 2B:
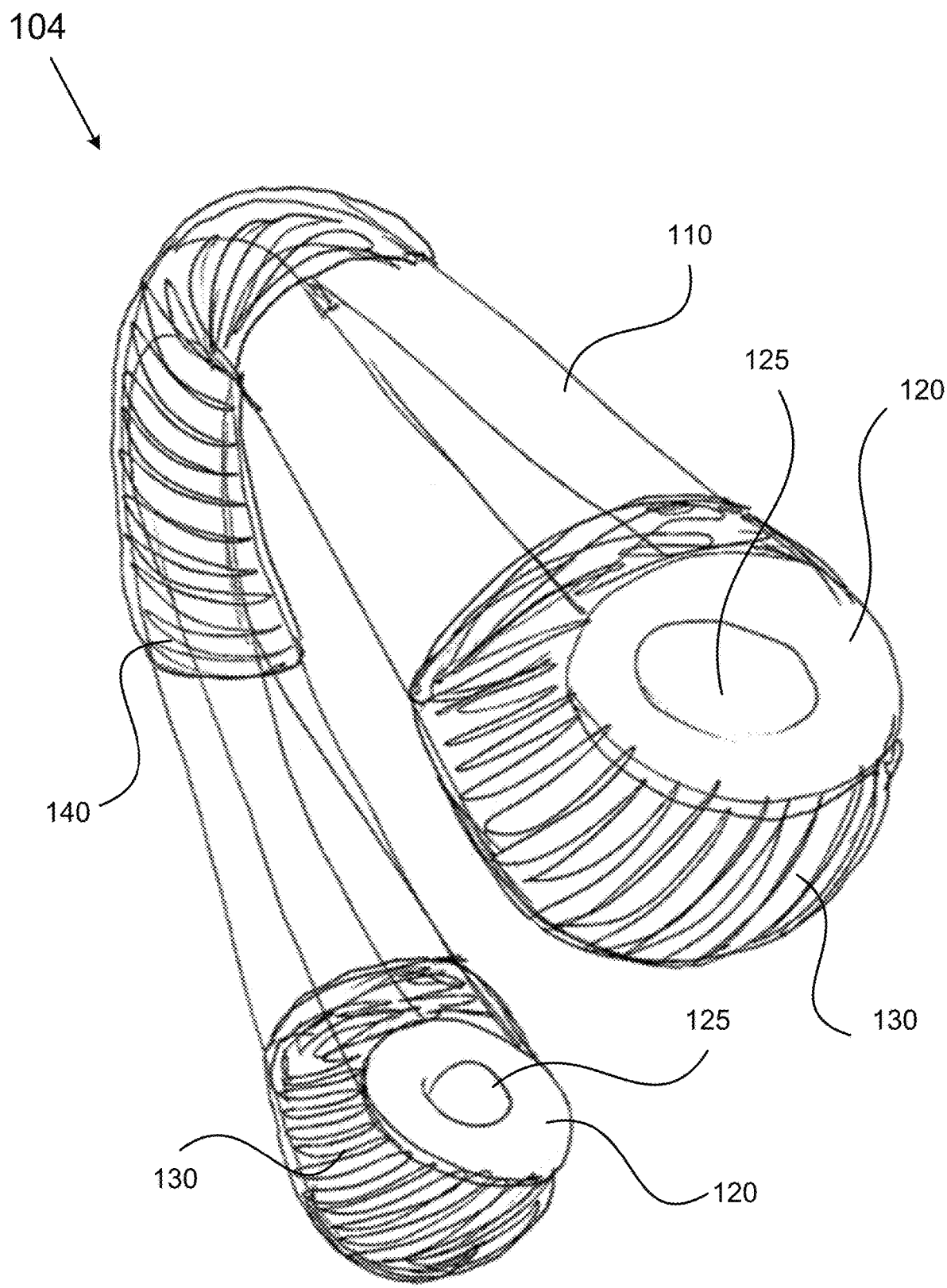

FIGS. 2A-B illustrate perspective views of example fiber rope bows to be used as part of a light weight load bearing shackle. The bows are illustrated in a generally "U" shape arrangement. FIG. 2A illustrates the bow 100 of FIG. 1A formed into the "U" shape so that the eyelets 120 are aligned with one another a certain distance apart. As the fiber rope loop 110 is flexible the exact configuration of the bow 100 may be adjusted and the configuration may be modified in use. As illustrated, the upper portion and the lower portion of the fiber rope loop 110 are separated to indicate they are not secured together in any fashion. As the fiber rope loop 110 is flexible the upper and lower portions would not remain separated as illustrated.

FIG. 2B illustrates the bow 104 of FIG. 1C formed into the "U" shape so that the eyelets 120 are aligned with one another a certain distance apart. As the rope loop 110 is flexible the exact configuration of the bow 104 may be adjusted and the configuration may be modified in use. According to one embodiment, the section 140 where the upper and lower portions of the rope loop 110 are connected may include a material that is formed in a manner to provide for the "U" shape.

FIGS. 2A-B do not illustrate a connection pin between the two legs of the bow 100, 104 for ease of illustration. However, the connection pin could be placed through the two eyelets 120 and be secured therein. For example, the connection pin could include a threaded bolt and nut where the bolt passes through each of the eyelets 120 and is secured in place with the nut. As previously mentioned, the fact that the bow 100, 104 is flexible may result in the bow 100, 104 sliding inward along the connection pin. If it was desired to prevent this from occurring a casing may be utilized between the legs of the bow 100, 104.

Figure 3:
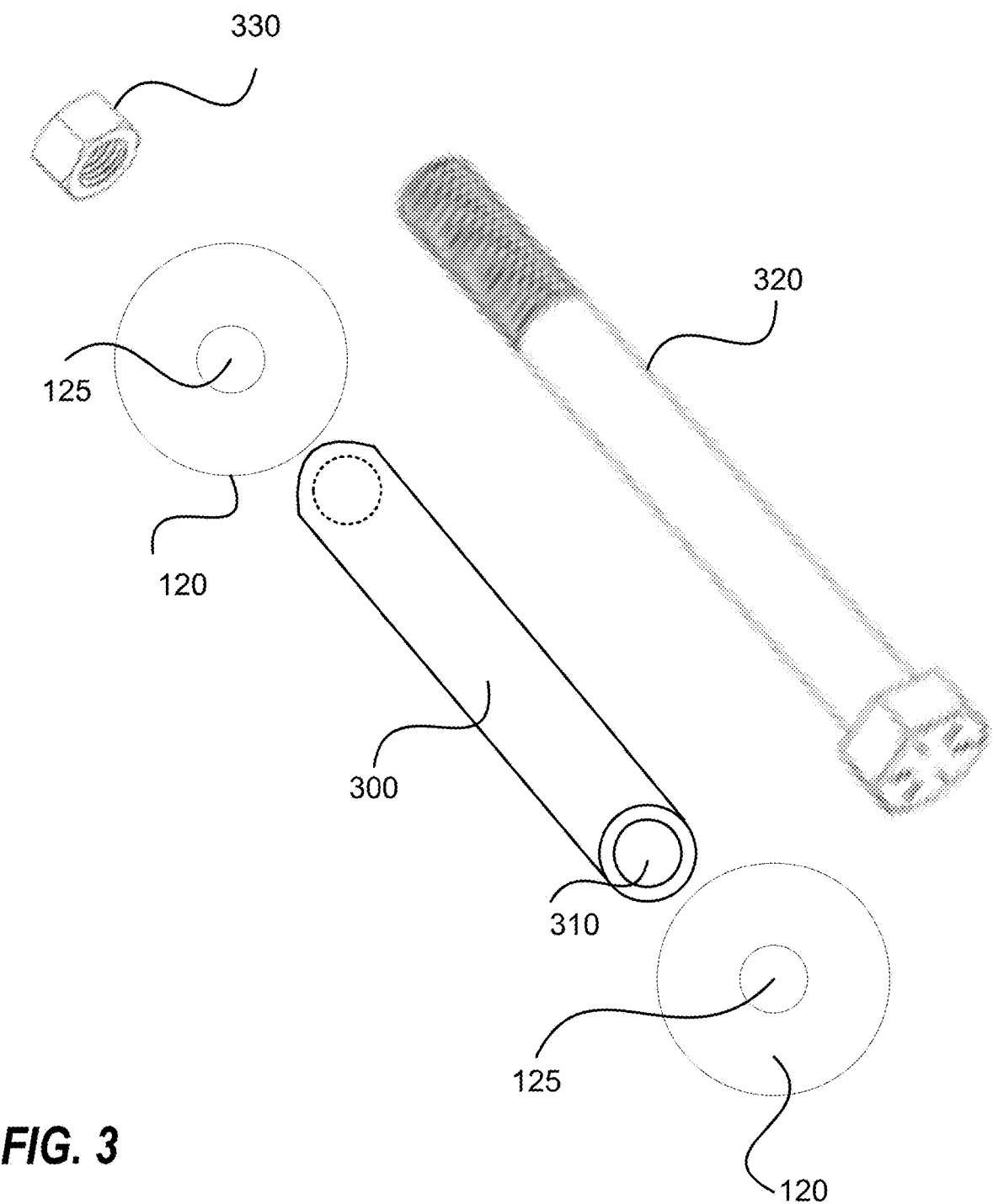
FIG. 3 illustrates an exploded view of an example casing to be used between the eyelets to maintain a minimum distance between the eyelets, according to one embodiment.

FIG. 3 illustrates an exploded view of an example casing 300 being used between the eyelets 120 to maintain a minimum distance between the eyelets 120. For ease of illustration the bow is not illustrated in FIG. 3. The casing 300 has a length associated with the minimum distance. The casing 300 has an open interior 310 traversing the length thereof to enable a connection pin (e.g., bolt) 320 to pass therethrough between the eyelets 120 of the bow. The connection pin 320 may be secured within the bow using, for example, a nut 330. An outer diameter of the casing 300 is wider than the openings 125 in the eyelets 120 to prevent the legs from moving inward and keep them the minimum distance apart. According to one embodiment, the casing 300 and the eyelets 120 may be secured together in some fashion. For example, the ends of the casing 300 may be threaded on an outer surface and the openings 125 may be threaded so that they may be screwed together. The minimum distance could be adjusted based on how far the casing 300 was screwed into the openings 125.

Figures 4A, 4B:
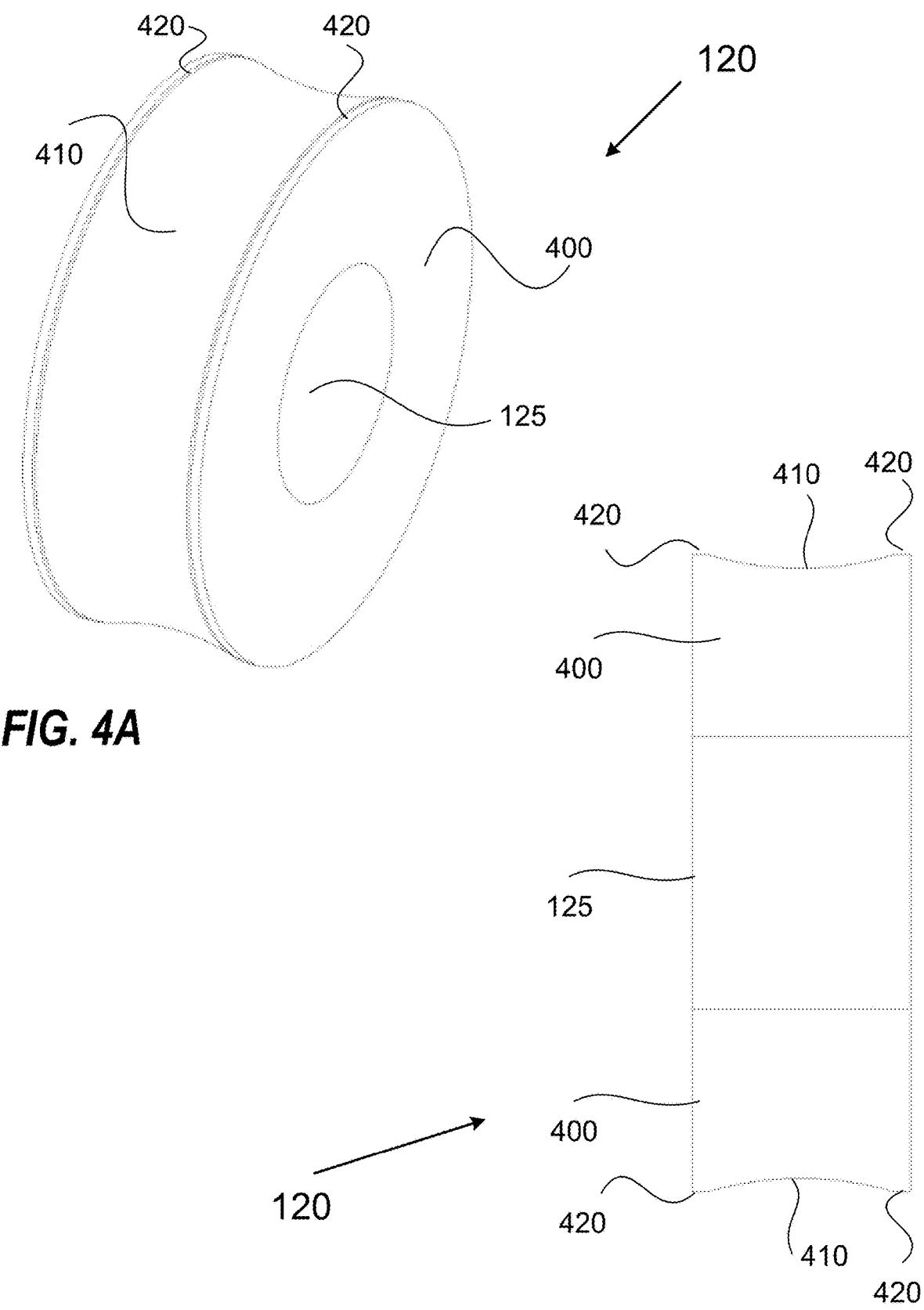
FIGS. 4A-B illustrate perspective and cross sectional views of an example eyelet, according to one embodiment.

FIGS. 4A-B illustrate perspective and cross sectional views of an example eyelet 120. The eyelet 120 includes a main body 400 having the opening 125 formed therethrough for receiving a connection pin. An exterior edge of the main body 400 may include a grove 410 formed therein for receiving the fiber rope loop 110. The groove 410 may be surrounded by sidewalls 420. As illustrated, the groove 410 is rounded but is in no way intended to be limited thereto. For example, the groove 410 may be flat on the bottom until it reaches the sidewalls 420 that extend perpendicular therefrom. Such a configuration could enable the rope loop 110 to lay flat therewithin.

The various embodiments illustrated in FIGS. 1A-D and 2A-B require the "U" shape to be established after the fiber rope loop 110 is secured to the eyelets 120. Such embodiments may be difficult to obtain the desired arrangement. According to one embodiment, the "U" shape may be obtained by the fiber loop rope 110 prior to securing to the eyelets 120.

Figure 5A:
FIGS. 5A-B illustrate an example method for providing a light weight fiber rope bow in a "U" shaped arrangement, according to one embodiment.
Figure 5B:
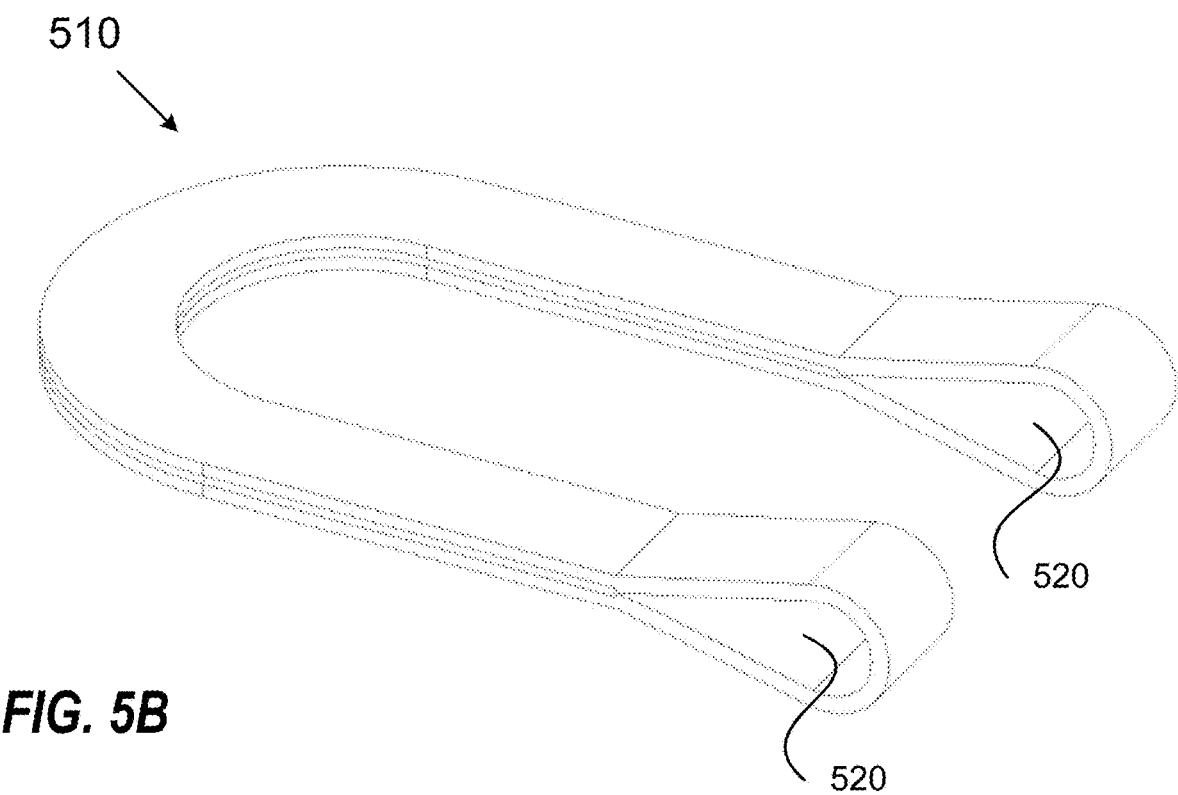

FIGS. 5A-B illustrate an example method for providing a light weight fiber rope bow in a "U" shaped arrangement. FIG. 5A illustrates a fiber rope being provided as a generally oval shaped loop 500. As previously noted, the generally oval shaped fiber rope loop 500 may include a plurality of loops of fiber rope. The various loops may all be the same type of fiber rope or various different types of fiber rope may be included. The various loops of fiber rope may be secured together in some fashion. The various loops of fiber rope may be housed in a sleeve. The manner in which the fiber rope loops are secured together, or the material that the fiber rope loops are housed in may vary without departing from the current scope.

FIG. 5B illustrates the generally oval shaped fiber rope loop 500 being folded in half so as to create a "U" shaped fiber rope bow 510. The upper and lower portions of the bow 510 may be secured together in some fashion. As previously noted, the upper and lower portions may be secured together by, for example, wrapping a material therearound or in the event the bow 510 is located within a sleeve by, for example, sewing or gluing the upper and lower sleeve together. The ends of the two legs formed in the "U" shaped fiber rope bow 510 may not be secured together so that loops 520 may be formed. The loops 520 may be used, for example, to secure eyelets (e.g., 120) therein. The eyelets may be secured to the loops 520 in some fashion (e.g., glued, molded, fused, bonded, taped, pined, riveted).

The various embodiments described above have discussed securing the fiber rope (e.g., loop 110, bow 510) around an eyelet (e.g., 120) to provide support for securing a connection pin (e.g., 320). Securing the fiber rope to the eyelet may be difficult. For example, it may require molding a material (e.g., 130) around the two components to hold them together. According to one embodiment, the fiber loop may be secured within eyelets. For example, the loops 520 may be placed within the eyelets and then be secured therein when the connection pin passes therethrough.

Figure 6:
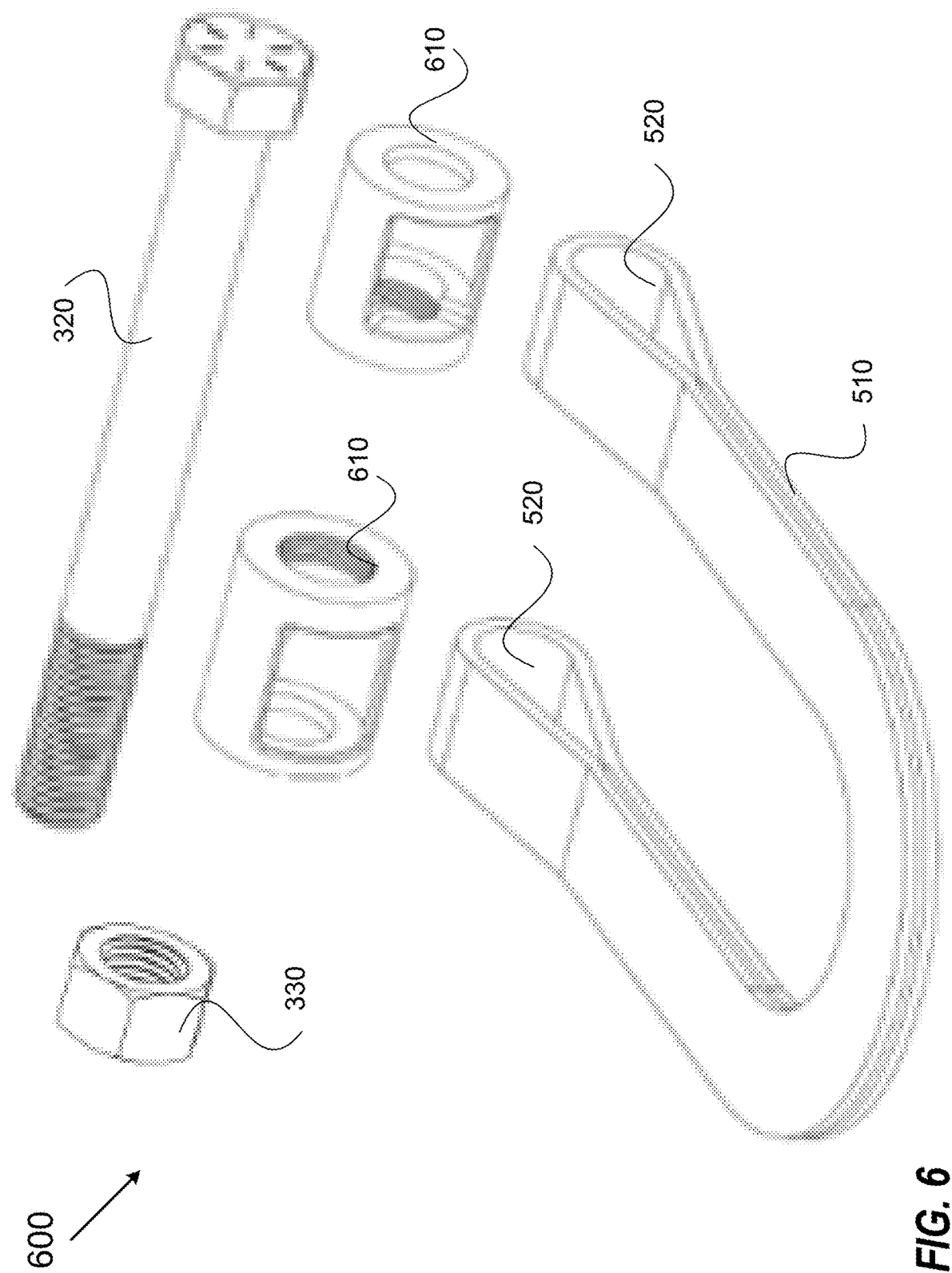
FIG. 6 illustrates an exploded view of an example light weight load bearing shackle, according to one embodiment.

FIG. 6 illustrates an exploded view of an example light weight load bearing shackle 600. The shackle 600 includes a "U" shaped fiber rope bow 510, a pair of barrel eyelets 610, a connection pin (e.g., bolt) 320 and a securing device (e.g., nut) 330. The fiber rope bow 510 includes the loops 520 formed at the end of the legs. The barrel eyelets 610 may include an opening in an outer perimeter to receive the loops 520 therewithin. The connection pin 320 may pass through the eyelet 610 and the loop 520 located within the eyelet 610 in order to secure the fiber rope bow 510 within the eyelets 610. According to one embodiment, a casing (not illustrated) could be utilized between the barrel eyelets 610 to maintain the legs of the bow 510 a minimum distance apart.

Figure 7:
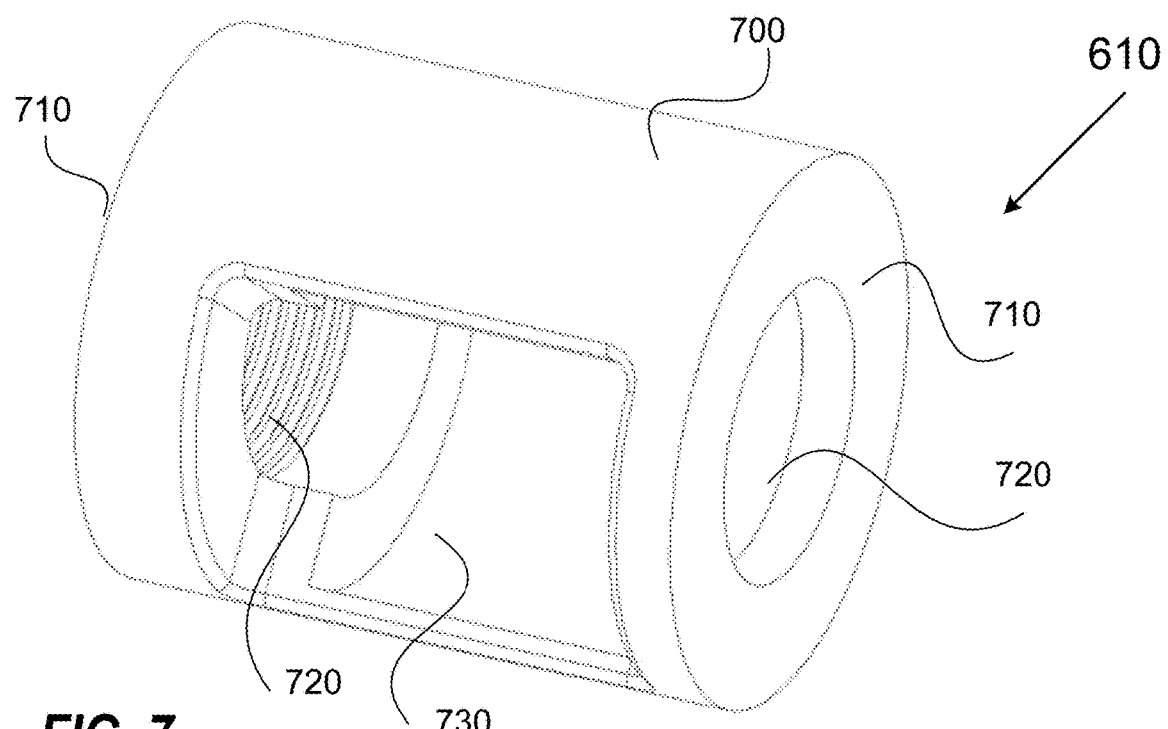
FIG. 7 illustrates a perspective view of an example barrel eyelet, according to one embodiment.

FIG. 7 illustrates a perspective view of an example barrel eyelet 610. The barrel eyelet 610 has a circular body 700 and two sides 710. Each of the sides 710 has a hole 720 formed therein that provides an open interior traversing longitudinally therethrough to allow the connection pin to pass therethrough. The body 700 includes an opening 730 formed therein to receive the loop 520. The eyelet 610 is sized so that the loop 520 can be housed therewithin. According to one embodiment, at least one of the holes 720 (e.g., hole that would face interior of the fiber rope bow 510) is threaded. The threading could enable a casing (e.g., 300) to be secured thereto so as to maintain the distance of the legs a minimum distance apart.

According to one embodiment, having a shaft within the barrel eyelet 610 to provide support for the connection pin 320 as well as to further secure the loop 520 therewithin would be beneficial. According to one embodiment, rather than using a single casing (e.g., 300) to maintain a minimum distance between the legs a separate casing that extends into the barrel eyelet 610 may be associated with each barrel eyelet 610.

Figure 8:
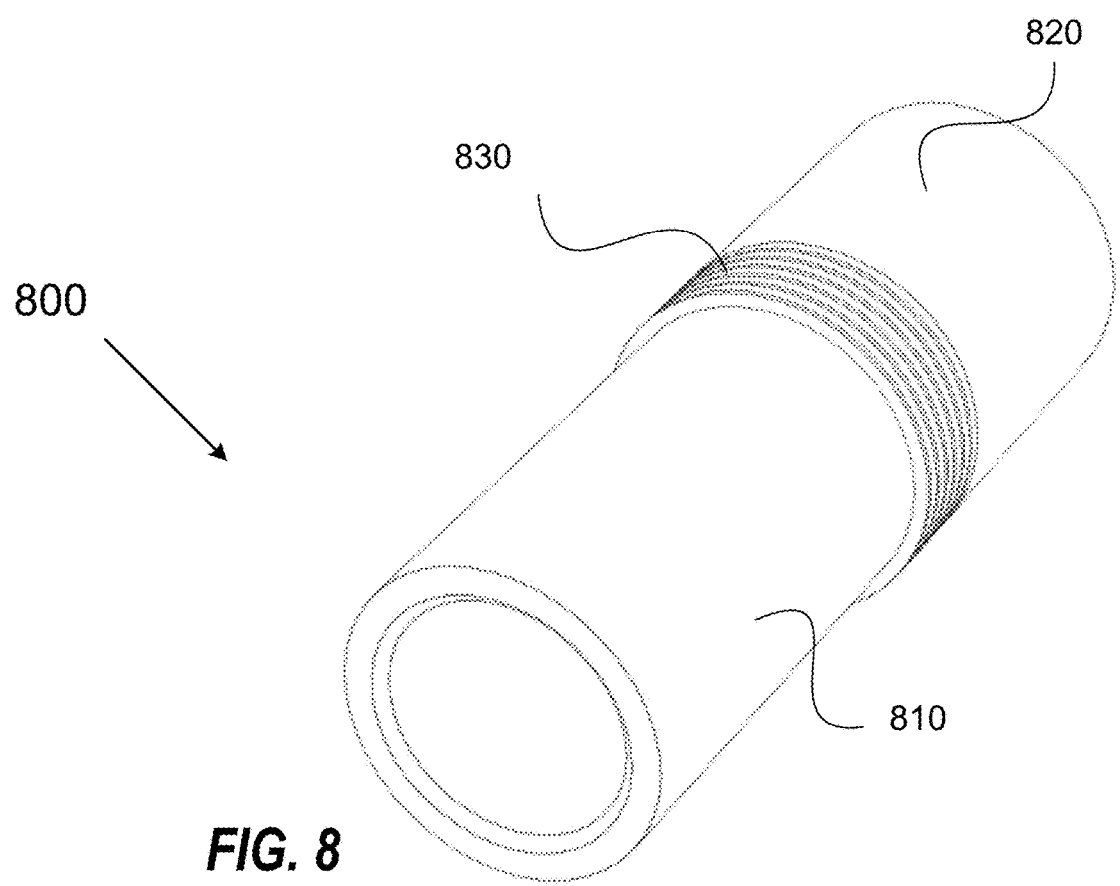
FIG. 8 illustrates a perspective view of an example casing, according to one embodiment.

FIG. 8 illustrates a perspective view of an example casing 800. The casing 800 includes a first portion 810, a second portion 820 and a threaded portion 830. The first portion 810 is narrower than the second portion 820. The threaded portion 830 is located on an end of the second portion 820 that abuts the first portion 810. The first portion 810 could pass through the threaded hole 720 in the barrel eyelet 610 in order to be located internal to the barrel eyelet 610. The casing 800 could then be secured to the barrel eyelet 610 by screwing the threaded portion 830 into the threaded hole 720. The second portion 820 would extend from the barrel eyelet 610 and provide the support for maintaining the legs a minimum distance apart when in use. When in use the two casings may abut each other to maintain the minimum distance. However, the distance could be expanded in which case the ends would not abut. According to one embodiment, an exterior end (opposite threaded portion 830) of the second portion 820 may be threaded (one internally and one externally) to secure the casings 800 together.

Figure 9A:
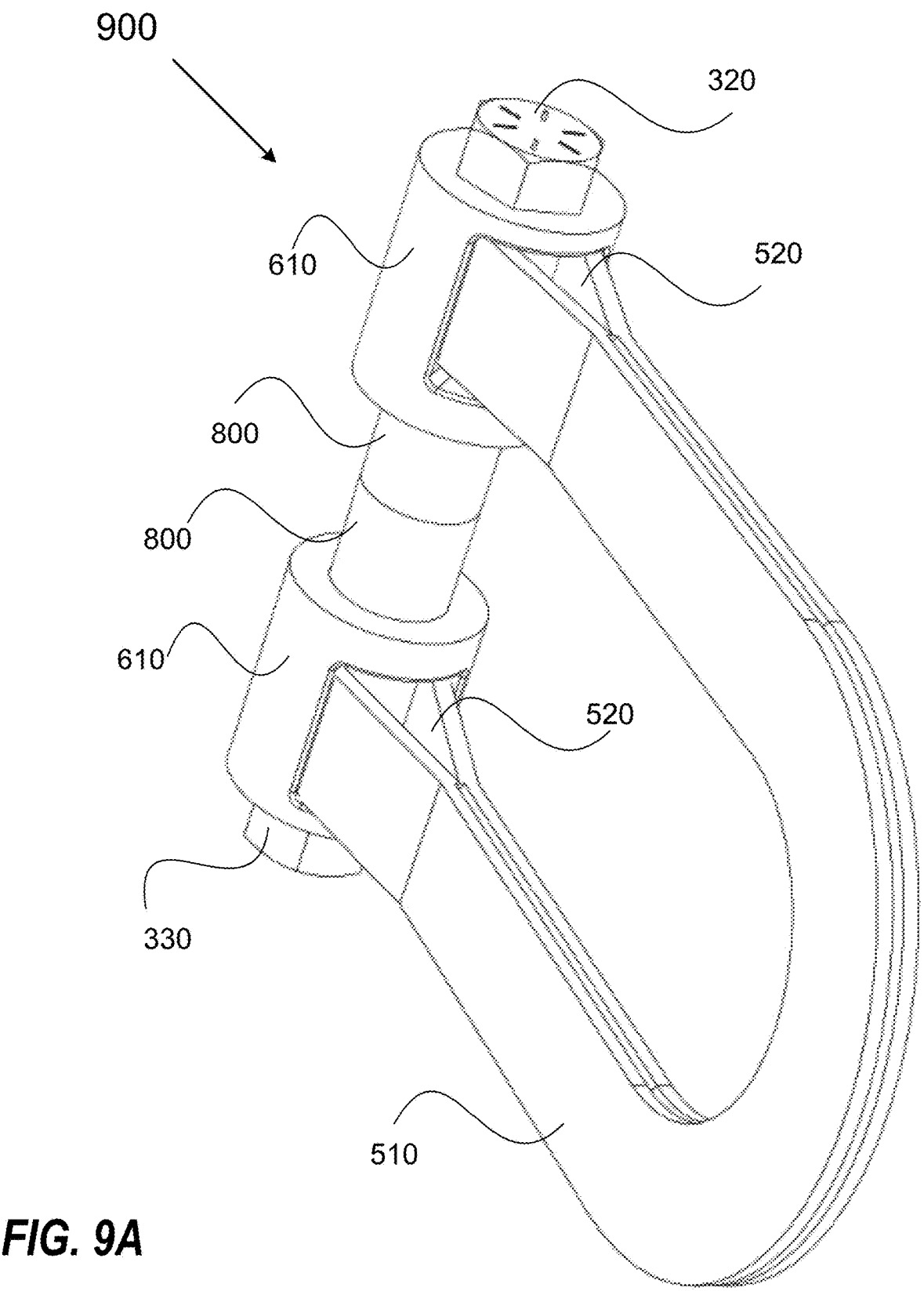
FIGS. 9A-B illustrate perspective and top views of an example light weight load bearing shackle, according to one embodiment.
Figure 9B:
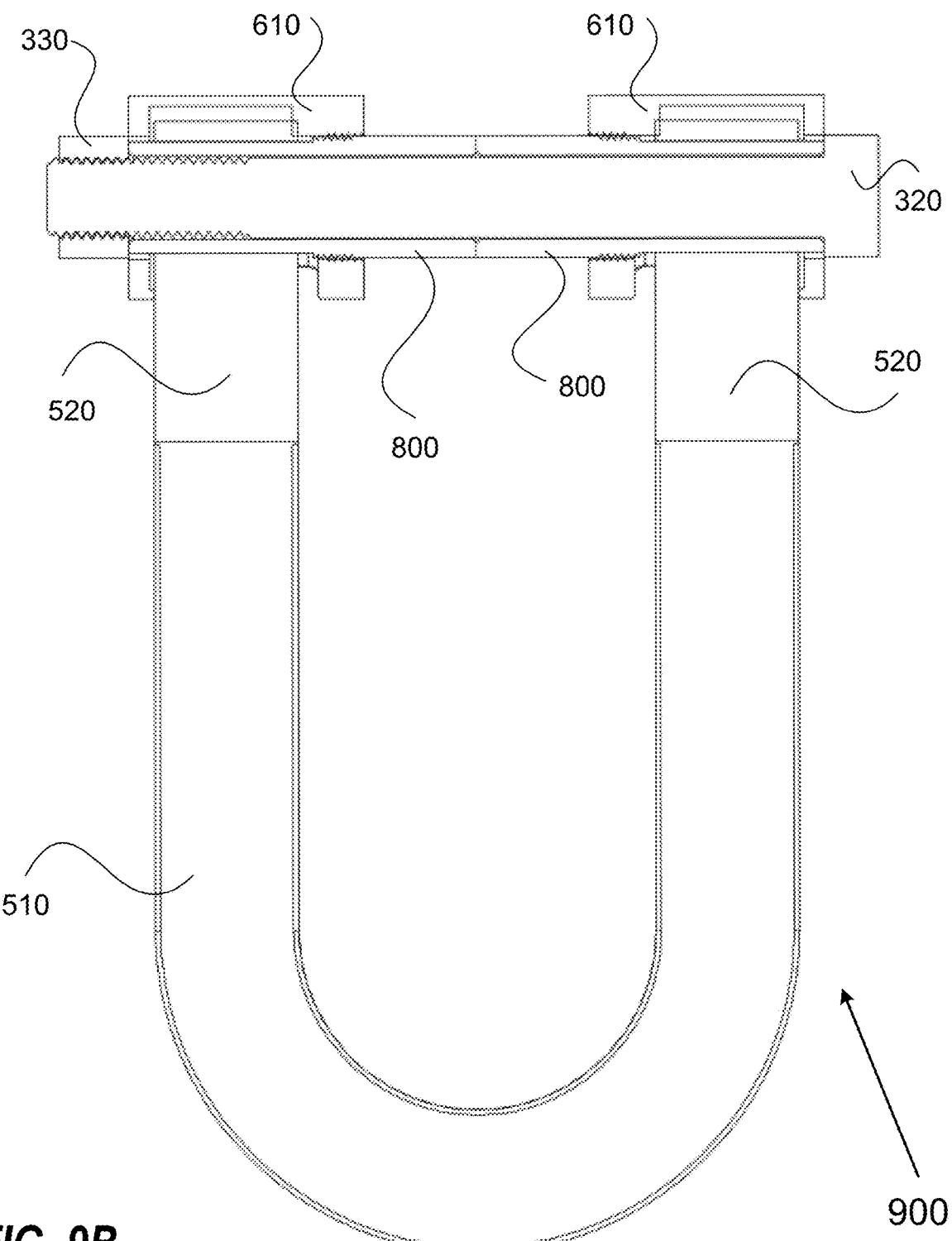

FIGS. 9A-B illustrate perspective and top views of am example light weight load bearing shackle 900. The shackle 900 includes a "U" shaped bow 510 made from fiber rope that includes loops 520 on each end. The loops 520 are secured within the barrel eyelets 610 and the casings 800. The second portion of the casings 800 extend inside the bow 900 and abut one another to provide the minimum separation between the legs thereof. The first portion of the casings 800 is located within the barrel eyelets 610 and helps secure the loops 520 therein as well as provide support for the connection pin 320. The connection pin 320 extends through the barrel eyelets 610 and the casings 800 and is secured in place with the nut 330.

The light weight load bearing shackle 900 is capable of supporting a similar load to that of a standard shackle. The weight difference enables the shackle 900 to be handled more easily. For example, depending on the load to be supported a standard shackle may weigh so much that it requires an apparatus to move it. A comparable light weight shackle 900 could be moved by an individual. Furthermore, as the shackle 900 is flexible it could be utilized in situations where a standard shackle could not be because it is made of a rigid material. For example, when the connection pin 320 is removed the shackle 900 could be opened up so as to more easily be installed in areas with limited space or be slid under, for example, a support cable that a standard shackle could not.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A light weight load bearing shackle comprising
a fiber rope wrapped to form a plurality of loops, wherein
the plurality of loops are substantially similar to one another and are substantially aligned with one another, wherein the plurality of loops are shaped into a bow having a first leg and a second leg, wherein the first leg includes a first opening and the second leg includes a second opening, and wherein flexibility of the fiber rope enables configuration of the bow to be adjusted and modified in operation;

a first eyelet located within the first opening, wherein the first leg is wrapped around the first eyelet;

a second eyelet located within the second opening, wherein the second leg is wrapped around the second eyelet;

a connection pin to traverse each of the first and the second eyelets and be secured thereto; and a material secured around a portion of the first leg and a portion of the first eyelet and a portion of the second leg and a portion of the second eyelet to secure the first and the second eyelets in the first and the second legs of the bow.

2. The shackle of claim 1, wherein the fiber rope includes fibers selected from at least one of polypropylene, nylon, polyesters, polyethylene, Aramids and acrylics.

3. The shackle of claim 1, wherein the fiber rope includes mixtures of several fibers or co-polymer fibers.

4. The shackle of claim 1, wherein the fiber rope includes fibers selected from at least one of straight, braided and twisted.

5. A light weight load bearing shackle comprising
a fiber rope wrapped to form a plurality of loops, wherein the plurality of loops are substantially similar to one another and are substantially aligned with one another;
a sheathing to house the plurality of loops therewithin, wherein the sheathing housing the plurality of loops is shaped into a bow having a first leg and a second leg, wherein the first leg includes a first opening and the second leg includes a second opening, and wherein flexibility of the sheathing housing the plurality of loops enables configuration of the bow to be adjusted and modified in operation;
a first eyelet located at the first opening;
a second eyelet located at the second opening; and
a connection pin to traverse each of the first and the second eyelets and be secured thereto.

6. The shackle of claim 5, wherein
the first opening is a first loop;
the second opening is a second loop;
the first eyelet is to wrap around the first leg and receive the first loop therewithin;
the second eyelet is to wrap around the first leg and receive the second loop therewithin; and
the connection pin is to secure the respective first and second loops within the respective first and second eyelets when the connection pin traverses therethrough.

7. The shackle of claim 5, further comprising a casing to be located within the bow between the first and the second eyelets and to allow the connection pin to traverse therethrough, wherein the casing is to maintain the first and the second legs of the bow a minimum distance apart.

8. A light weight load bearing shackle comprising
a bow made of a plurality of loops of fiber rope, wherein the plurality of loops of the fiber rope are folded in half to form a substantially "U" shaped bow having a pair of legs, wherein each of the pair of legs includes a loop at an end thereof;

a pair of barrel eyelets, wherein a first barrel eyelet is to receive a loop from a first leg of the bow and a second barrel eyelet is to receive a loop from a second leg of the bow; and a connection pin to traverse each of the pair of barrel eyelets and an associated loop located therewithin and to be secured thereto.

9. The shackle of claim 8, wherein the fiber rope includes fibers selected from at least one of polypropylene, nylon, polyesters, polyethylene, Aramids, acrylics, mixtures of several fibers and co-polymer fibers.

10. The shackle of claim 8, wherein
the bow includes a sheathing that the plurality of loops of fiber rope are secured within; and
an upper portion of the sheathing is secured to a lower portion of the sheathing when the plurality of loops of fiber rope are folded in half.

11. The shackle of claim 8, further comprising a casing to be located within the barrel eyelets and to allow the connection pin to traverse through, wherein the casing is to maintain the legs of the bow a minimum distance apart.

12. The shackle of claim 8, further comprising a pair of casings, wherein a first casing is to be located within the first barrel eyelet and extend internal to the bow and a second casing is to be located within the second barrel eyelet and extend internal to the bow, wherein the pair of casings are to allow the connection pin to traverse through, wherein the pair of casings are to maintain the legs of the bow a minimum distance apart.

13. A method of making a light weight load bearing shackle, the method comprising
wrapping a fiber rope into a plurality of loops;
folding the plurality of loops of the fiber rope in half to form a generally "U" shaped bow;
securing an upper portion of the bow and a lower portion of the bow together;
leaving the upper portion and the lower portion unsecured at an end of each leg of the bow to form a loop of each leg;
placing a loop of a first leg within a first barrel eyelet;
placing a loop of a second leg within a second barrel eyelet;
placing a connection pin through the first barrel eyelet and the loop of the first leg;
placing the connection pin through the second barrel eyelet and the loop of the second leg; and
securing the connection pin in place.

14. The method of claim 13, further comprising placing the plurality of loops of the fiber rope into a sheathing.

15. The method of claim 13, further comprising placing the connection pin through a casing between the first barrel and the second barrel.

16. The method of claim 13, further comprising
securing a first casing within the first barrel eyelet and having it extend internal to the bow; and
securing a second casing within the second barrel eyelet and having it extend internal to the bow; and
wherein when the connection pin passes through the first barrel eyelet it also passes through the first casing and when the connection pin passes through the second barrel eyelet it also passes through the second casing, wherein the pair of casings are to maintain the legs of the bow a minimum distance apart.

17. A light weight load bearing shackle comprising
a bow made of fiber rope;
a pair of eyelets located at an end of each leg of the bow;
a casing to be located between the pair eyelets; and a connection pin to traverse each of the pair of eyelets and the casing and be secured therewithin, wherein the casing is to maintain the legs of the bow a minimum distance apart.

18. A light weight load bearing shackle comprising
a bow made of a plurality of loops of fiber rope, wherein the plurality of loops of the fiber rope are arranged to form a substantially "U" shaped bow having a first leg and a second leg, wherein the first leg includes a first loop at an end thereof and the second leg includes a second loop at an end thereof;
a first eyelet to wrap around the first leg of the bow so an opening in the first eyelet is aligned with an opening in the first loop;
a second eyelet to wrap around the second leg of the bow so an opening in the second eyelet is aligned with an opening in the second loop; and
a connection pin to traverse each of the first eyelet and the second eyelet and to be secured thereto.

19. The shackle of claim 18, wherein the bow includes a sheathing that the plurality of loops of fiber rope are secured within.

20. The shackle of claim 19, wherein an upper portion of the sheathing is secured to a lower portion of the sheathing when the plurality of loops of fiber rope are folded in half.

* * * * *